A. A. CANTON.
SPEEDOMETER.
APPLICATION FILED MAY 17, 1913.
1,225,312.  Patented May 8, 1917.
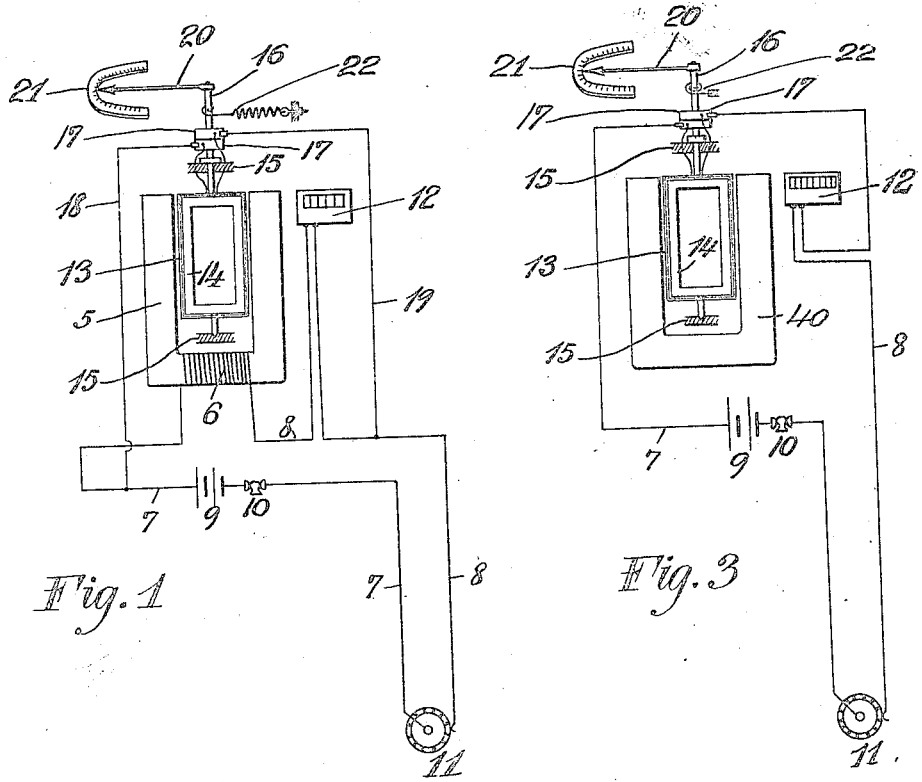
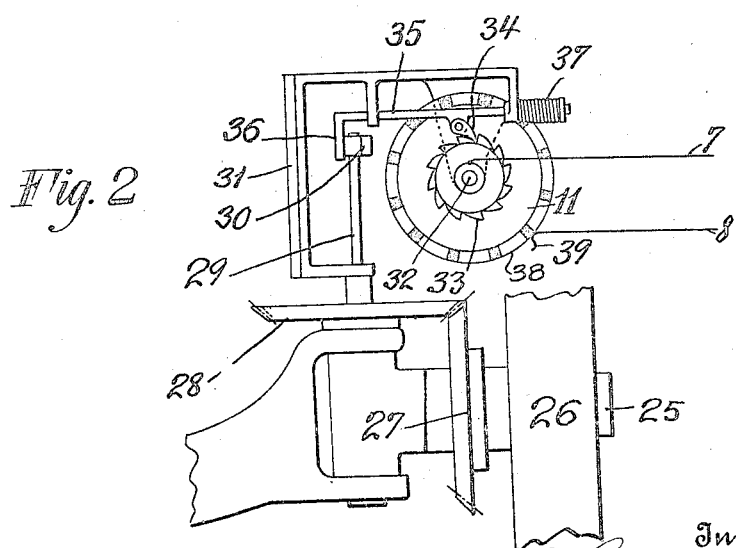
Witnesses:
H. G. Le Cerd
H. Bayles.
Inventor
Allen A. Canton
By his Attorney
Ivan E. A. Konigsberg

UNITED STATES PATENT OFFICE.

ALLEN A. CANTON, OF NEW YORK, N. Y., ASSIGNOR TO THE DEVICE TESTING COMPANY, A CORPORATION OF CONNECTICUT.

SPEEDOMETER.

1,225,312.  Specification of Letters Patent.  Patented May 8, 1917.

Application filed May 17, 1913. Serial No. 768,220.

*To all whom it may concern:*

Be it known that I, ALLEN A. CANTON, a citizen of the United States of America, and a resident of the city, county, and State of New York, have invented certain new and useful Improvements in Speedometers, of which the following is a specification.

This invention relates to speedometers. The object of the invention is to provide an electrically operated speedometer of novel and useful construction adapted to be manufactured at a relatively low cost and one which may be easily attached to the vehicle the speed of which is to be measured. Other objects ancillary to the main object of the invention will appear as this specification proceeds.

In the drawing accompanying this specification and illustrating the invention—

Figure 1 is a diagrammatic view of an apparatus embodying the invention.

Fig. 2 is a detail view showing one form of interrupter or make and break device, and Fig. 3 is a diagrammatic view similar to Fig. 1 but showing a modification.

Referring to Fig. 1 the numeral 5 designates an electromagnet having the coil 6 in the circuit 7—8 which includes the battery 9, a snap switch 10 and the interrupter 11. 12 represents any suitable form of electrically operated counting device connected in series with the interrupter. 13 represents a movable coil wound upon the soft iron core 14 which is pivoted in bearings 15, 15 in a well known manner. The shaft 16 of the core 14 carries two collector rings 17 to which the terminals of the coil 13 are connected and which in turn are connected across the battery by the wires 18 and 19 by suitable sliding terminals of the shunt wires 18 and 19. 20 is a needle secured to the shaft 16 and which moves over a suitable scale 21. The spring device 22 tends to keep the needle at zero in a well known manner.

The interrupter is suitably driven from the vehicle, the speed of which is to be measured, and is so arranged that the frequency of the interruptions in the circuit 7—8 directly affects the strength of the electro-magnet 5 at a ratio directly proportioned to the frequency with the result that the higher the frequency the greater is the torque between the electro-magnet and the coil 13 which, because of well known principles of electricity, causes a deflection or movement of the coil and the shaft 16 which is observed in the movement of the needle over the scale. The latter being suitably graduated, the speed of the vehicle, translated through the interrupter, may be read directly on the scale.

It will, however, be apparent, that the period of duration of contact in the interrupter, must be constant irrespective of the speed of the vehicle in order that the pulsations through the circuit 7—8 may be of equal strength and cause a strengthening, directly proportioned in ratio to the frequency of interruptions, of the electromagnet so as to cause a movement of the needle large enough to be observed so as to be of practical value.

If the interrupter was in the form of an ordinary commutator driven directly at the vehicle speed, it is obvious that the faster the commutator rotated, the shorter would be the period of duration of contact and the shorter would be the impulses in the circuit and the measure of the speed expressed by the movement of the needle would be subject to two variable factors, namely, the speed and the length of the period of duration of contact in the interrupter, hence would be impracticable as a speed indicator.

I have overcome this difficulty by arranging the interrupter so that the period of duration of contact is constant irrespective of the speed of the vehicle, consequently the movement of the needle is subjected to only one variable factor, namely, the speed of the vehicle, which thus can be measured by the deflection of the coil 13 as seen by the position of the needle with relation to the scale.

The arrangement is shown in Fig. 2 in which 25 represents the axle of a front automobile wheel 26. Upon this axle is mounted a gear 27 which drives another gear 28 on a shaft 29 carrying an arm or projection 30. 31 represents a bracket or other support which is secured to the vehicle and which supports the various parts as shown. The interrupter 11 is mounted on a shaft 32 and carries a ratchet 33. 34 is a pawl pivotally carried by a reciprocating slide 35 in the bracket 31 having a depending lug 36 kept in contact with the arm 30 by the spring 37.

The one wire 7 is connected to the shaft 32 hence to the conducting segments 38 of the interrupter. The other wire 8 has a sliding terminal 39 in contact with the circumference of the interrupter like a brush.

The operation is as follows. The arm 30 on shaft 29 is rotated at the same speed as the wheel axle 25 and thus for each revolution the slide 35 is forced to the left by the arm 30 striking the depending lug 36. As soon as the arm 30 has passed the lug 36 the slide 35 is pulled to the right by the spring 37 and this movement of the slide is of course constant no matter how often it occurs in a given time unit. The movement to the right causes the pawl 34 to engage and move the ratchet one tooth, consequently rotates the interrupter one step, so that it will be apparent that the period of duration of contact between any one segment 38 and the wire terminal 39 is constant, because it depends upon the pull of the spring which is constant and not upon the speed of the shafts 29 and 25, from which it will be seen that the impulses or pulsations in the circuit 7—8 are of an equal duration and that the strength of the electro-magnet is varied in direct proportion with the frequency of the interruptions, that is the speed of the vehicle.

In Fig. 3 I have shown an apparatus in which 40 represents a permanent magnet and the strength of the current in coil 13 is varied directly by the frequency of the interruptions in circuit 7—8.

The speedometer as here described may be started or stopped by the switch 10, which of course might be automatic in its operation by the motion of the vehicle.

Details of construction may be varied within the principle of the invention and the scope of the appended claims.

I claim:—

1. A speedometer comprising a movable indicator, an electromagnet for producing a magnetic field, a coil mounted to move within said magnetic field to operate said movable indicator, an electric circuit for supplying current to said electromagnet, a current interrupting device in said circuit and means for operating said interrupting device to cause current impulses of equal duration to pass through said electric circuit and said electromagnet.

2. A speedometer comprising a movable indicator, an electromagnet for producing a magnetic field, a coil mounted to move within said magnetic field to operate said movable indicator, an electric circuit for supplying current to said electromagnet, a current interrupting device in said circuit and means for operating said interrupting device to cause current impulses of equal duration to pass through said electric circuit and said electromagnet irrespective of the operating speed of said interrupting device.

3. A speedometer comprising a movable indicator, an electromagnet for producing a magnetic field, a coil mounted to move within said magnetic field to operate said movable indicator, an electric circuit for supplying current to said electromagnet, a rotatable current interrupting device in said circuit and means for rotating said device stepwise through a constant angle for each step irrespective of the operating speed of said interrupting device.

4. The combination with a shaft the speed of which is to be measured, of a speedometer comprising an indicator, an electric circuit, an electromagnet therein for operating said indicator, means for varying the strength of said electromagnet comprising a current interrupting device and a member driven by said shaft for intermittently operating said device to cause current impulses of equal duration to pass through the said electric circuit and electromagnet irrespective of the operating speed of the said shaft.

5. The combination with a shaft the speed of which is to be measured, a speedometer comprising an indicator, an electromagnet for operating said indicator, means for passing current impulses of equal duration through said electromagnet to vary the strength thereof, said means comprising an electric circuit, an interrupting device for interrupting the current in said circuit and means driven by said shaft for intermittently operating said interrupting device.

Signed at New York, N. Y., this 16 day of May 1913.

ALLEN A. CANTON.

Witnesses:
K. G. LE ARD,
IVAN KONIGSBERG.